US011359573B2

(12) United States Patent
Iwasaki et al.

(10) Patent No.: US 11,359,573 B2
(45) Date of Patent: Jun. 14, 2022

(54) CONTROL DEVICE FOR INTERNAL COMBUSTION ENGINE

(71) Applicant: TOYOTA JIDOSHA KABUSHIKI KAISHA, Toyota (JP)

(72) Inventors: Ryota Iwasaki, Toyota (JP); Masanao Idogawa, Nagoya (JP); Ryusuke Kuroda, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 193 days.

(21) Appl. No.: 15/254,651

(22) Filed: Sep. 1, 2016

(65) Prior Publication Data

US 2017/0058822 A1    Mar. 2, 2017

(30) Foreign Application Priority Data

Sep. 2, 2015  (JP) .............................. JP2015-172598

(51) Int. Cl.
*F02D 41/40* (2006.01)
*F02D 37/02* (2006.01)
(Continued)

(52) U.S. Cl.
CPC ........... *F02D 41/402* (2013.01); *F02D 37/02* (2013.01); *F02D 41/0235* (2013.01);
(Continued)

(58) Field of Classification Search
CPC ........ F02D 41/402; F02D 37/02; F02D 43/04; F02D 41/0235; F02D 2200/0802;
(Continued)

(56) References Cited

U.S. PATENT DOCUMENTS

2005/0109020 A1* 5/2005 Ichise ................. F02D 41/0235
60/285
2015/0128567 A1* 5/2015 Kondo .................. F01N 11/002
60/274

(Continued)

FOREIGN PATENT DOCUMENTS

DE           40 37 183 A1    5/1991
DE     10 2014 118 588 A1    6/2015
(Continued)

OTHER PUBLICATIONS

JP 2015166559—English Translation.*
(Continued)

*Primary Examiner* — Scott A Reinbold
(74) *Attorney, Agent, or Firm* — Oblon, McClelland, Maier & Neustadt, L.L.P.

(57) ABSTRACT

A control device for an internal combustion engine capable of performing additional injection in addition to regular injection includes an electronic control unit. The electronic control unit is configured to calculate an ignition timing at a predetermined crank angle before a compression top dead center. The electronic control unit is configured to calculate an injection amount of fuel at a predetermined time interval and to calculate an injection amount of the fuel at the predetermined crank angle. The electronic control unit is configured to control the fuel injection valve such that the fuel injection valve additionally injects the fuel in an increase amount before ignition, when the injection amount calculated at the predetermined crank angle is increased due to retardation of the ignition tinting calculated after the fuel in the injection amount calculated at the predetermined time interval is regularly injected.

2 Claims, 5 Drawing Sheets (51) Int. Cl.
*F02D 41/02* (2006.01)
*F02D 43/04* (2006.01)
*F02P 5/04* (2006.01)
*F02P 5/15* (2006.01)
*F02D 41/38* (2006.01)

(52) U.S. Cl.
CPC .............. *F02D 43/04* (2013.01); *F02P 5/045* (2013.01); *F02P 5/1502* (2013.01); *F02D 2041/0265* (2013.01); *F02D 2041/389* (2013.01); *F02D 2200/0802* (2013.01); *F02D 2200/0804* (2013.01); *F02D 2250/12* (2013.01); *Y02T 10/40* (2013.01)

(58) Field of Classification Search
CPC ........... F02D 2250/12; F02D 2041/389; F02D 2041/0265; F02D 2200/0804; F02D 41/40; F02D 41/401; F02D 41/024; F02P 5/1502; F02P 5/045; F02P 5/04; Y02T 10/46; Y02T 10/44; Y02T 10/123; Y02T 10/26; F02B 3/10; F02M 45/02; F01N 9/005; F02N 2200/026
USPC ......................................................... 123/299
See application file for complete search history.

(56) References Cited

U.S. PATENT DOCUMENTS

| | | | |
|---|---|---|---|
| 2015/0167576 A1* | 6/2015 | Glugla | F02D 41/025 |
| | | | 123/295 |
| 2016/0222899 A1* | 8/2016 | Glugla | F02D 41/024 |

FOREIGN PATENT DOCUMENTS

| | | | |
|---|---|---|---|
| EP | 2 855 903 B1 | | 9/2017 |
| JP | 2007-327408 | | 12/2007 |
| JP | 2009019521 A | * | 1/2009 |
| JP | 2009019521 A | * | 1/2009 |
| JP | 2013-249792 | | 12/2013 |
| JP | 2015-166558 | | 9/2015 |
| JP | 2015166559 A | * | 9/2015 |
| JP | 2015166559 A | * | 9/2015 |

OTHER PUBLICATIONS

JP 2009019521—English Translation.*
JP 2009019521—English Translation (Year: 2009).*
JP 2015166559—English Translation (Year: 2014).*

* cited by examiner

CONTROL DEVICE FOR INTERNAL COMBUSTION ENGINE

INCORPORATION BY REFERENCE

The disclosure of Japanese Patent Application No. 2015-172598 filed on Sep. 2, 2015 including the specification, drawings and abstract is incorporated herein by reference in its entirety.

BACKGROUND OF THE INVENTION

1. Field of the Invention

The invention relates to a control device for an internal combustion engine.

2. Description of Related Art

An internal combustion engine is known that retards the ignition timing for performing the torque down or the like. In such an internal combustion engine, when the ignition timing is retarded, the exhaust gas temperature increases so that there is a possibility that a catalyst disposed in an exhaust passage may be overheated. In view of this an internal combustion engine has been proposed that suppresses overheating of a catalyst by increasing the fuel injection amount when retarding the ignition timing (see, e.g. Japanese Patent Application Publication No. 2013-249792 (JP 2012-249792 A)). In this internal combustion engine, when the fuel injection amount is increased, it is possible to suppress a rise in the temperature of the exhaust gas and the catalyst by the heat of vaporization of the fuel.

SUMMARY OF THE DISCLOSURE

Herein, in the internal combustion engine described above, when retardation of the ignition timing is required after the fuel is injected, since an increase in the amount of the fuel cannot be in time, it is necessary to delay the implementation of the ignition retard in order to suppress the overheating of the catalyst.

The disclosure provides a control device for an internal combustion engine, that is capable of performing retardation of an ignition timing early while suppressing overheating of a catalyst.

According to an aspect of the disclosure, there is provided a control device for an internal combustion engine. The internal combustion engine includes: a fuel injection valve that injects fuel directly into a combustion chamber an ignition device provided in the combustion chamber; and a catalyst provided in an exhaust passage, and is capable of performing additional injection in addition to regular injection. The control device includes an electronic control unit. The electronic control unit is configured to calculate an ignition timing at a predetermined crank angle before as compression top dead center. The electronic control unit is configured to calculate an injection amount of the fuel at a predetermined time interval and to calculate an injection amount of the fuel at the predetermined crank angle. The electronic control unit is configured to control the fuel injection valve such that the fuel injection valve additionally injects the fuel in an increase amount before ignition, when the injection amount calculated at the predetermined crank angle is increased due to retardation of the ignition timing calculated after the fuel in the injection amount calculated at the predetermined time interval is regularly injected.

With this configuration, since the ignition timing and the fuel injection amount are calculated at the predetermined crank angle before the compression top dead center, when the ignition timing is retarded, the injection amount that is increased in accordance with a retard amount can be calculated. Then, only an increase amount relative to the fuel injected at the time of regular injection is additionally injected before the ignition so that retardation of the ignition timing can be performed early while suppressing overheating of the catalyst. That is, without waiting for the increase amount due to the ignition retard to be reflected on an injection amount for regular injection calculated at the predetermined time interval, when retardation of the ignition timing is required, the increase amount due to the ignition retard can be additionally injected so that the ignition retard can be implemented early.

In the above-described aspect, the electronic control unit may be configured to set an upper limit of the number of injection times of the fuel in one cycle. The electronic control unit may be configured to increase the upper limit of the number of injection times when an operating condition of the internal combustion engine is in a catalyst overheat warning range where the injection amount is increased when the ignition timing is retarded. The catalyst overheat warning range may be determined based on a load factor and a rotational speed.

With this configuration, in the catalyst overheat warning range, it is possible to provide a state in which additional injection can be performed.

In the above-described aspect, the electronic control unit may be configured to set a timing of additional injection to the predetermined crank angle when an operating condition of the internal combustion engine is in a catalyst overheat warning range where the injection amount is increased when the ignition timing is retarded. The catalyst overheat warning range may be determined based on a load factor and a rotational speed.

With this configuration, in the catalyst overheat warning range, when the ignition timing calculated at the predetermined crank angle before the compression top dead center is retarded so that an injection amount in accordance with a retard amount is calculated, an increase amount due to the retard can be additionally injected.

In the above-described aspect, when the increase amount due to retardation of the ignition timing, is included in the injection amount calculated at the predetermined time interval, the electronic control unit may be configured to regularly inject the fuel including the increase amount and not to perform additional injection.

With this configuration, it is possible to suppress an increase in the number of times of injection.

According to the aspect of the disclosure, it is possible to perform retardation of the ignition timing early while suppressing overheating of the catalyst.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinbelow, an embodiment of the disclosure will be described with reference to the drawings. In this embodiment, a description will be given of a case where the disclosure is applied to an Electronic Control Unit (ECU) that controls an internal combustion engine mounted on a vehicle.

First, retelling to FIG. 1, a schematic configuration of an internal combustion engine 1 controlled by an ECU 100 will be described.

Figure 1:
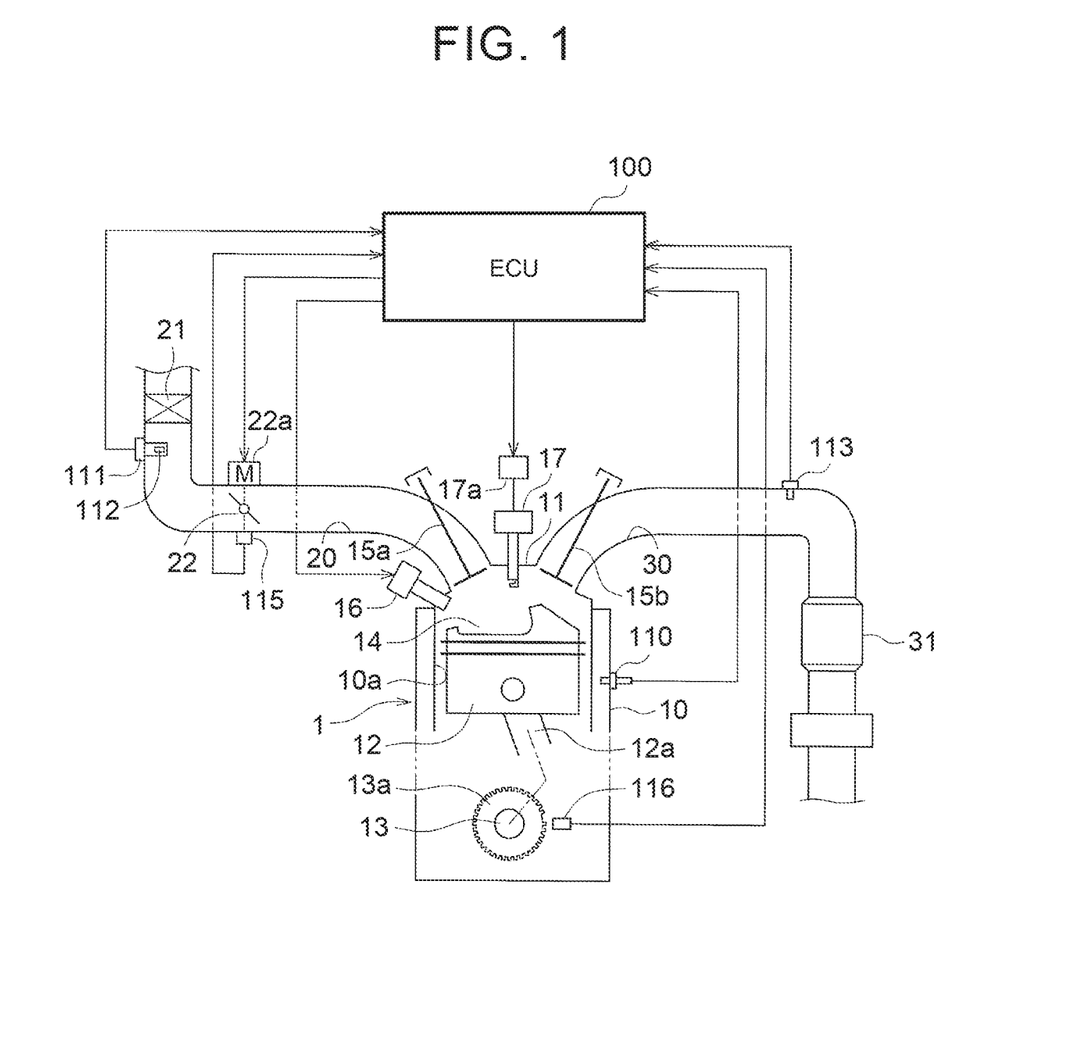
FIG. 1 is a schematic configuration diagram showing one example of an internal combustion engine to which an Electronic Control Unit (ECU) according to an embodiment of the disclosure is applied.

As shown in FIG. 1, the internal combustion engine 1 includes a cylinder block 10 and a cylinder head 11 mounted en the cylinder block 10. The internal combustion engine 1 is, for example, a direct-injection inline four-cylinder gasoline engine. In FIG. 1, only one of four cylinders its shown.

Four cylinder bores 10a are formed in the cylinder block 10 and a piston 12 is reciprocatingly disposed in each of the cylinder bores 10a. A crankshaft 13 as an output shaft is connected to the pistons 12 via connecting rods 12a. The connecting rod 12a has a function to convert a reciprocating motion of the piston 12 into a rotary motion of the crankshaft 13. A signal rotor 13a is attached to the crankshaft 13 and a crank position sensor 116 is disposed near the signal rotor 13a.

A combustion chamber 14 is formed between the piston 12 and the cylinder head 11 in each cylinder bore 10a. An intake passage 20 and an exhaust passage 30 are connected to the combustion chambers 14. An air cleaner 21 for filtering the intake air, a throttle valve 22 for adjusting the intake air amount, and so on are disposed in the intake passage 20. The throttle valve 22 is driven by a throttle motor 22a. A three-way catalyst 31 for purifying harmful substances in an exhaust gas, and so on are disposed in the exhaust passage 30.

In the cylinder head 11, intake valves 15a are disposed that respectively establish or interrupt communication between the combustion chambers 14 and the intake passage 20, and exhaust valves 15b are disposed that respectively establish or interrupt communication between the combustion chambers 14 and the exhaust passage 30. Further injectors (fuel injection valves) to that respectively inject fuel directly into the combustion chambers 14 and spark plugs 17 are disposed in the cylinder head 11. The ignition timing of the spark plug 17 is adjusted by an igniter 17a.

The fuel is supplied from a fuel tank (not shown) to the injectors 16 and, when the fuel is injected from the injector 16 directly into the combustion chamber 14, a mixture of the air and the fuel is formed in the combustion chamber 14. This air-fuel mixture is ignited by the spark plug 17 to be burned/exploded. The piston 12 is reciprocated by a combustion gas generated in this event to cause the crankshaft 13 to rotate so that a driving force (output torque) of the internal combustion engine 1 is obtained. In the internal combustion engine 1, fuel injection from the injector 16 can be carried out a plurality of times in one cycle including an intake stroke, a compression stroke, a combustion stroke, and an exhaust stroke.

Next, referring to FIGS. 2 and 3, the ECU 100 that controls the internal combustion engine 1 will be described.

Figure 2:
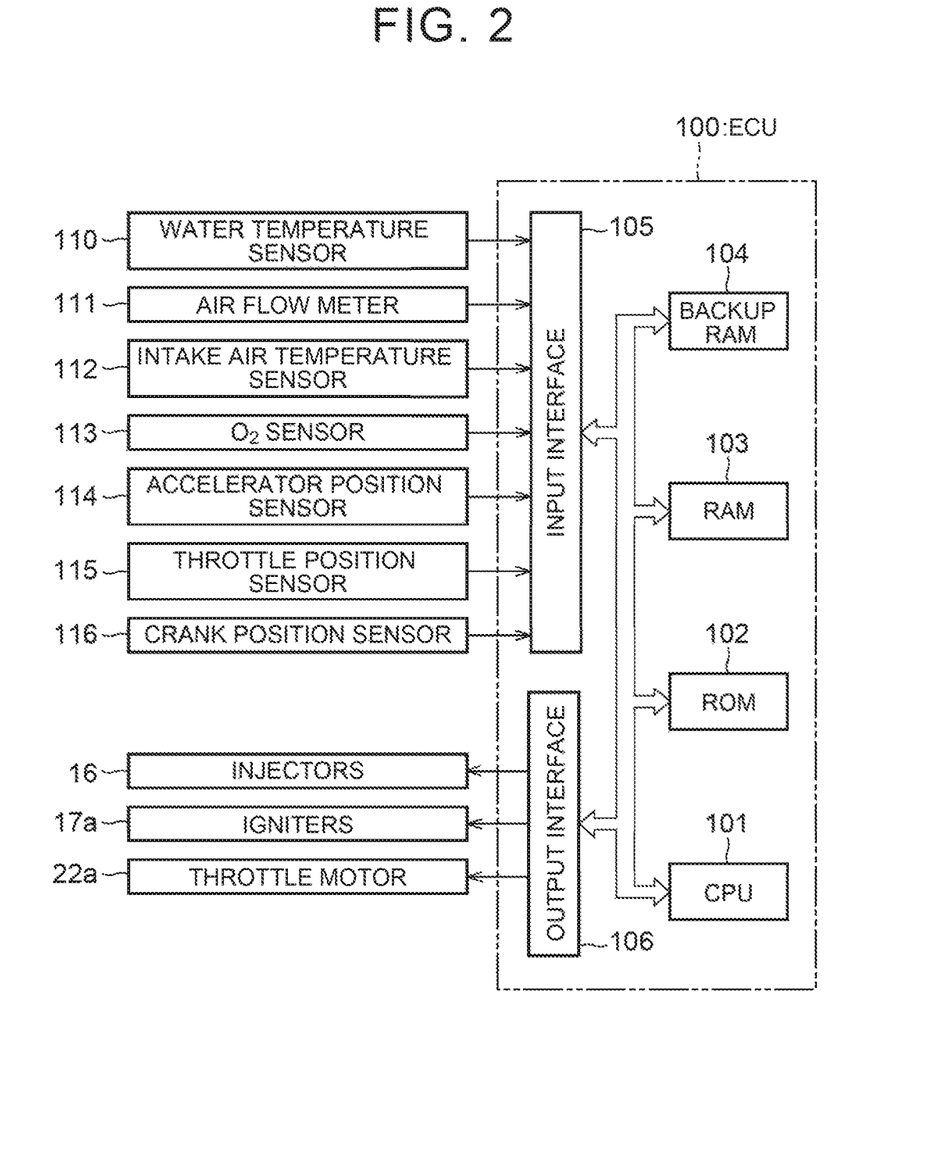
FIG. 2, is a block diagram showing the configuration of the ECU.
Figure 3:
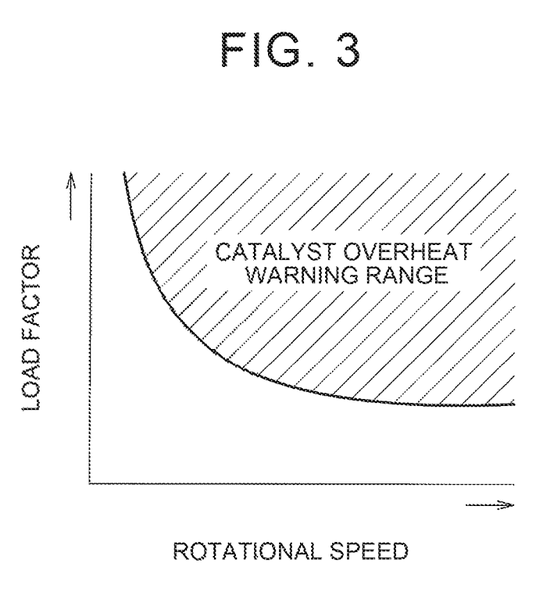
FIG. 3 is a map for determining whether or not the operating condition of the internal combustion engine is in a catalyst overheat warning range.

As shown in FIG. 2, the ECU 100 includes a CPU 101, at ROM 102, a RAM 103, a backup RAM 104, an input interface 105, and an output interface 106. The ECU 100 is one example of an ignition timing calculation unit and an injection amount calculation unit, and these units are realized by execution of programs stored in the ROM 102 by the CPU 101.

The CPU 101 performs calculation processing based on various control programs, maps, and so on stored in the ROM 102. The ROM 102 stores therein various control programs, maps that are referred to when executing those various control programs, and so on. The RAM 103 is a memory that temporarily stores calculation results by the CPU 101, detection results of various sensors, and so on. The backup RAM 104 is a nonvolatile memory that stores data and so on to be kept when turning off the ignition.

A water temperature sensor 110 for detecting a cooling water temperature of the internal combustion engine 1, an air flow meter 111 for detecting an intake air amount, an intake air temperature sensor 112 for detecting a temperature of intake air, an $O_2$ sensor 113 for detecting an oxygen concentration in an exhaust gas, an accelerator position sensor 114 for detecting an operation amount (depression amount) of an accelerator pedal, a throttle position sensor 115 for detecting an opening degree of the throttle valve 22, the crank position sensor 116 for detecting a rotational position of the crankshaft 13, and so on are connected to the input interface 105.

The injectors 16, the igniters 17a, the throttle motor 22a, and so on are connected to the output interface 106.

The ECU 100 is configured to control the operating condition of the internal combustion engine 1 by controlling the throttle opening degree (intake air amount), the fuel injection amount, the ignition timing, and so on based on the detection results of the various sensors, and so on.

The internal combustion engine 1 is capable of carrying out fuel injection a plurality of times in one cycle and, in the ECU 100, the allowed number of times (upper limit) of fuel injection in one cycle is set in advance according to a rotational speed per unit time (hereinafter referred to simply as a "rotational speed") of the internal combustion engine 1. Specifically, as the rotational speed of the internal combustion engine 1 increases, the allowed number of times of fuel injection in one cycle decreases. One example of the relationship between the rotational speed of the internal combustion engine 1 and the allowed number of times of fuel injection is shown in Table 1 below. It is to be noted that the allowed number of times is the number of times by which fuel injection can be allowed in one cycle and not the number of times by which fuel injection is actually carried out in one cycle.

TABLE 1

| Rotational Speed (rpm) | 0~899 | 900~1799 | 1800~3599 | 3600~ |
|---|---|---|---|---|
| Allowed Number of Times | 4 | 3 | 2 | 1 |

In one example of carrying out fuel injection a plurality of times in one cycle, regular injection is carried out at a dine point of 300° CA (crank angle) before the compression top dead center and additional injection is carried out at a time point of 150°~120° CA before the compression top dead center. This additional injection is for adjusting the fuel injection amount using an air amount determined after the intake valve 15a is closed.

Herein, there are cases where the ECU 100 temporarily decreases the output torque of the internal combustion engine 1 by retarding the ignition timing, for example, when shifting a transmission (not shown) mounted on a vehicle. In this way, when the torque down of the internal combustion engine 1 is performed, it is possible to suppress shift shock at the time of the gear shift.

However, when the ignition timing of the internal combustion engine 1 is retarded, the exhaust gas temperature increases so that there is a possibility that the three-way catalyst 31 may be overheated depending on the operating condition of the internal combustion engine 1. Therefore, it is configured that when the ignition timing is retarded when the operating condition of the internal combustion engine 1 is in a catalyst overheat warning range (catalyst OT range), the fuel injection amount is increased to increase the heat of vaporization of the fuel, thereby suppressing a rise in the temperature of the exhaust gas and the three-way catalyst 31. That is, the catalyst overheat warning range is a range where the overheating of the three-way catalyst 31 is predicted if the ignition timing is retarded, and is a range where when the ignition timing is retarded, the fuel injection amount is increased in order to suppress the overheating of the three-way catalyst 31. Specifically, as shown in FIG. 3, the catalyst overheat warning range is a high-speed and high-load range in a map using as parameters the rotational speed and the load factor of the internal combustion engine 1.

Next, referring to FIG. 3, a catalyst overheat suppression control by the ECU 100 of this embodiment will be described.

The ECU 100 is configured to determine whether or not the operating condition of the internal combustion engine 1 is in the catalyst overheat warning range. Whether or not the operating condition of the internal combustion engine 1 is in the catalyst overheat warning range is determined based on the map using as parameters the rotational speed and the load factor of the internal combustion engine 1 (see FIG. 3). The load factor is a ratio of an intake air amount in a current operating condition relative to the maximum intake air amount into the internal combustion engine 1 and, for example, is calculated based on an intake air amount and a rotational speed of the internal combustion engine 1. The map shown in FIG. 3 is stored, for example, in the ROM 102.

Then, the ECU 100 is configured to increase by one the allowed number of times of fuel injection in one cycle when the internal combustion engine 1 is in the catalyst overheat warning range. For example, when the rotational speed of the internal combustion engine 1 is 3600 rpm or more, the allowed number of times which is once at normal time (not in the catalyst overheat warning range) is set to twice in the catalyst overheat warning range. Therefore, even when the rotational speed of the internal combustion engine 1 is high (3600 rpm or more in Table 1), additional injection can be carried out in the catalyst overheat warning range.

Further, the ECU 100 is configured to determine, after increasing the allowed number of times of fuel injection, whether or not the number of injection times of the same cylinder last time is greater than the allowed number of times at normal time, and configured to return the allowed number of times to the initial value upon an affirmative determination. For example, when fuel injection is carried out twice in a predetermined cylinder after the allowed number of times is increased by one when the rotational speed of the internal combustion engine 1 is 3600 rpm or more in the catalyst overheat warning range, the allowed number of times is returned to once in the next cycle of the predetermined cylinder. It is to be noted that the allowed number of times remains increased from a time point at which the predetermined cylinder injects the fuel twice to a time point at which the allowed number of times is returned to once, so that the other cylinders can each inject the fuel twice. That is, it is configured that fuel injection exceeding the allowed number of times at normal time is prevented from being carried out repeatedly in the same cylinder.

Further, the ECU 100 is configured to set an injection start timing of additional injection to 90° CA before the compression top dead center when the internal combustion engine 1 is in the catalyst overheat warning range, 90° CA before the compression top dead center is a timing at which an ignition timing in each cylinder is finally calculated, and is one example of "a predetermined crank angle" of the invention. That is, the injection start timing of additional injection Which is 150°~120° CA before the compression top dead center at normal time is retarded to 90° CA before the compression top dead center in the catalyst overheat warning range.

On the other hand, the ECU 100 is configured to calculate a fuel injection amount in one cycle at a predetermined time interval. This predetermined time interval is a preset time interval and is, fur example, 8 ms. The fuel injection amount is calculated by adding an increase value to a base value that provides a stoichiometric mixture. The increase value is calculated by adding a basic increase value and a correction increase value. The basic increase value is calculated based on a rotational speed and as load factor of the internal combustion engine 1, and so on, while the correction increase value is calculated based on an ignition timing retard amount and so on.

At 90° CA before the compression top dead center in each cylinder, the ECU 100 is configured to calculate an ignition timing of the cylinder and to calculate a fuel injection amount in one cycle.

Herein, the fuel injection amount calculated at the predetermined time interval and the fuel injection amount calculated at 90° CA before the compression top dead center become the same value when the operating conditions of the internal combustion engine 1 are the same at the respective calculation timings. On the other hand, the fuel injection amount calculated at the predetermined time interval and the fuel injection amount calculated at 90° CA before the compression top dead center become different values when the operating conditions of the internal combustion engine 1 differ from each other at the respective calculation timings, because the fuel injection amounts corresponding to the respective operating conditions are calculated. That is, since the calculation timings are different, the values of the fuel injection amounts calculated become different from each other when the operating conditions of the internal combustion engine 1 differ from each other.

For example, when ignition retard is not required, a correction increase value due to the ignition retard is zero for a fuel injection amount calculated at the predetermined time interval and a fuel injection amount calculated at 90° CA before the compression to dead center. On the other hand, when ignition retard is required so that an ignition timing calculated at 90° CA before the compression top dead center is retarded, a fuel injection amount including, a correction increase value due to the ignition retard is calculated at that time point (90° CA before the compression to dead center). Therefore, when the ignition timing is retarded, the fuel injection amount that is increased in accordance with the retard amount can be calculated at once. Thereafter, upon arrival of the control cycle of the predetermined time interval in the state where the ignition retard is required, at fuel injection amount including a correction increase value due to the ignition retard is calculated.

Next, referring to FIG. 4, a description will be given of one example of a control when the ignition timing is retarded in the catalyst overheat warning range. Hereinbelow, a description will be given of a case where, in the process in which a first cylinder #1, a third cylinder #3, a fourth cylinder #4, and a second cylinder #2 are ignited in this order, the ignition timing is retarded after the operating condition of the internal combustion engine 1 falls in the catalyst overheat warning range. Details of the sequence of setting a fuel injection amount when the fuel is injected will be described later.

Figure 4:
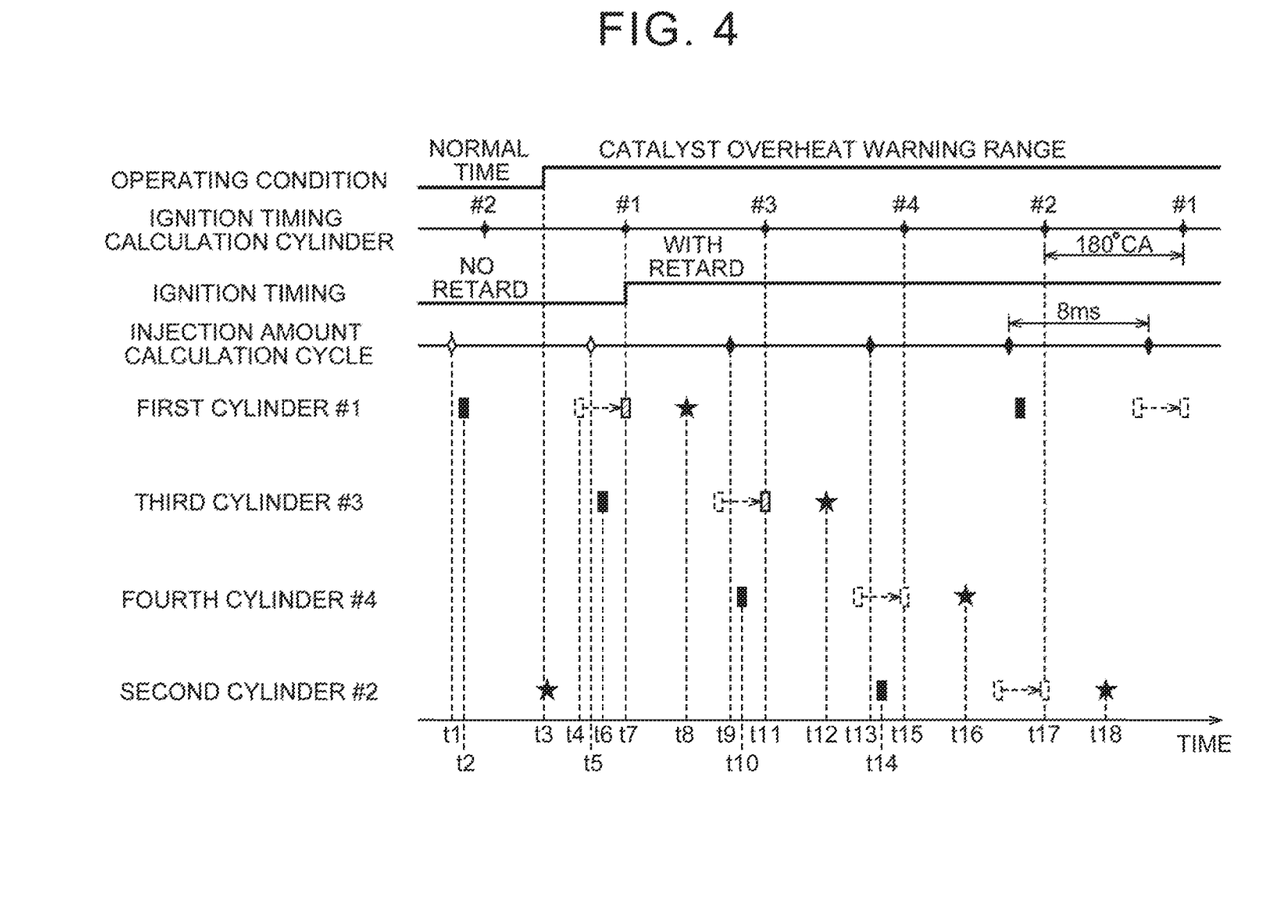
FIG. 4 is a timing chart showing one example of fuel injection and ignition manners in the internal combustion engine.

First, at time t1 in FIG. 4, a fuel injection amount in one cycle is calculated upon arrival of a control cycle of a predetermined time interval (e.g. 8 ms), in this event, the operating condition of the internal combustion engine 1 is at normal time and further the ignition timing is not retarded. Therefore, an increase value of the fuel injection amount calculated is only a basic increase value and a correction increase value due to ignition retard is zero.

Then, at time t2 (300° CA before the compression top dead center of the first cylinder #1, the fuel injection amount calculated at the predetermined time interval is regularly injected in the first cylinder #1. That is, the fuel in the injection amount calculated at time t1 is injected.

Thereafter, at time t3, when the operating condition of the internal combustion engine 1 falls in the catalyst overheat warning range, the injection start timing of additional injection in each cylinder is retarded. For example, in the first cylinder #1, the injection start timing of additional injection which is time t4 (150°~120° CA before the compression top dead center) at normal time is retarded to time t7 (90° CA before the compression top dead center. Further, the allowed number of times of fuel injection in one cycle is increased by one Whether or not the internal combustion engine 1 is in the catalyst overheat warning range is determined based on the rotational speed and the load factor of the internal combustion engine 1.

At time t5, a fuel injection amount in one cycle is calculated upon arrival of the control cycle of the predetermined time interval. In this event, as at time t1, an increase value of the fuel injection amount calculated is only a basic increase value and a correction increase value due to ignition retard is zero.

Then, at time t6 (300° CA before the compression top dead center of the third cylinder #3), the fuel injection amount calculated at the predetermined time interval is regularly injected in the third cylinder #3. That is, the fuel in the injection amount calculated at time t5 is injected.

Then, at time t7 (90° CA before the compression top dead center of the first cylinder #1), an ignition timing of the first cylinder #1 is calculated. In this event, since ignition retard is required for torque down, a retarded ignition timing is calculated. Further, a fuel injection amount in one cycle is calculated. An increase value of the fuel injection amount calculated in this event includes, in addition to a basic increase value, a correction increase value due to the ignition retard. That is, when the ignition timing is retarded at 90° CA before the compression top dead center, the fuel injection amount added with the correction increase value corresponding to the ignition retard is calculated. Since the injection start timing of additional injection is retarded to 90° CA before the compression top dead center, the difference between the fuel injection amount calculated at time t7 and the fuel injection amount regularly injected, at time t2 (the increase amount due to the ignition retard) is additionally injected.

Thereafter, at time t8, ignition is carried out in the first cylinder #1. This ignition timing is the ignition timing calculated at time t7 and thus is the retarded ignition timing. A mixture ignited contains the fuel regularly injected at time t2 and the fuel additionally injected at time t7. That is, the fuel in the mixture includes the increase amount due to the ignition retard.

Then, at time t9, a fuel injection amount in one cycle is calculated upon arrival of the control cycle of the predetermined tinge interval. In this event, since the ignition retard is required, an increase value of the fuel injection amount calculated includes, in addition to a basic increase value, a correction increase value due to the ignition retard. That is, a fuel injection amount calculated at every predetermined time interval is in a state of reflecting an increase amount due to the ignition retard.

Then, at time t10 (300° CA before the compression to dead center of the fourth cylinder #4), the fuel injection amount calculated at the predetermined time interval is regularly injected in the fourth cylinder #4. That is, the fuel in the injection amount calculated at time t9 and including the increase amount due to the ignition retard is injected.

Then, at time t11 (90° CA before the compression top dead center of the third cylinder #3), an ignition timing of the third cylinder #3 is calculated. In this event, since the ignition retard is required, a retarded ignition timing is calculated. Further, a fuel injection amount in one cycle is calculated. An increase value of the fuel injection amount calculated in this event includes, in addition to a basic increase value, a correction increase value due to the ignition retard. That is, the fuel injection amount added with the correction increase value corresponding to the ignition retard is calculated. Since the injection start timing of additional injection is retarded to 90° CA before the compression to dead center, the difference between the fuel injection amount calculated at time t11 and the fuel injection amount regularly injected at time t6 (the increase amount due to the ignition retard) is additionally injected.

Thereafter, at time t12, ignition is carried out in the third cylinder #3. This ignition timing is the ignition timing calculated at time t11 and thus is the retarded ignition timing. A mixture ignited contains the fuel regularly injected at time t6 and the fuel additionally injected at time t11. That is, the fuel in the mixture includes the increase amount due to the ignition retard.

Then, at time t13, a fuel injection amount in one cycle is calculated upon arrival of the control cycle of the predetermined time interval. In this event, since the ignition retard is required, an increase value of the fuel injection amount calculated includes, in addition to a basic increase value, a correction increase value due to the ignition retard as at time t9.

Then, at time t14 (300° CA before the compression top dead center of the second cylinder #2), the fuel injection amount calculated at the predetermined time interval is regularly injected in the second cylinder #2. That is, the fuel in the injection amount calculated at time t13 and including the increase amount due to the ignition retard, is injected.

Then, at time t15 (90° CA before the compression top dead center of the fourth cylinder #4), an ignition timing of the fourth cylinder #4 is calculated. In this event, since the ignition retard is required, a retarded ignition timing is calculated. Further, a fuel injection amount in one cycle is calculated. An increase value of the filet injection amount calculated in this event includes, in addition to a basic increase value, a correction increase value due to the ignition retard. Herein, in the fourth cylinder since the increase amount due to the ignition retard is injected at the time of the regular injection at time t10, additional injection is not carried out.

Thereafter, at time t16, ignition is carried, out in the fourth cylinder #4. This ignition timing is the ignition timing calculated at time t15 and thus is the retarded ignition timing. A mixture ignited contains the fuel regularly injected at time t10 (the fuel including the increase amount due to the ignition retard).

Then, at time t17 (90° CA before the compression top dead center of the second cylinder #2), an ignition timing of the second cylinder #2 is calculated. In this event, since the ignition retard is required, a retarded ignition timing is calculated. Further, a fuel injection amount in one cycle is calculated. An increase value of the fuel injection amount calculated in this event includes, in addition to a basic increase value, a correction increase value due to the ignition retard. Herein, in the second cylinder #2, since the increase amount due to the ignition retard is injected at the time of the regular injection at time t14, additional injection is not carried out.

Thereafter, at time t18, ignition is carried out in the second cylinder #2. This ignition timing is the ignition timing calculated at time t17 and thus is the retarded ignition timing. A mixture ignited contains the fuel regularly injected at time t14 (the fuel including the increase amount due to the ignition retard).

Next, referring to FIG. 5, a description will be given of one example of the sequence of setting a fuel injection amount by the ECU 100 of this embodiment. As described above, the ECU 100 of this embodiment is configured to calculate a fuel injection amount in one cycle at a predetermined time interval (e.g. 8 ms) and to calculate a fuel injection amount in one cycle at 90° CA before the compression top dead center in each cylinder. The following flow is repeatedly implemented when the operating condition of the internal combustion engine 1 is in the catalyst overheat warning range. The following steps are executed by the ECU 100.

Figure 5:
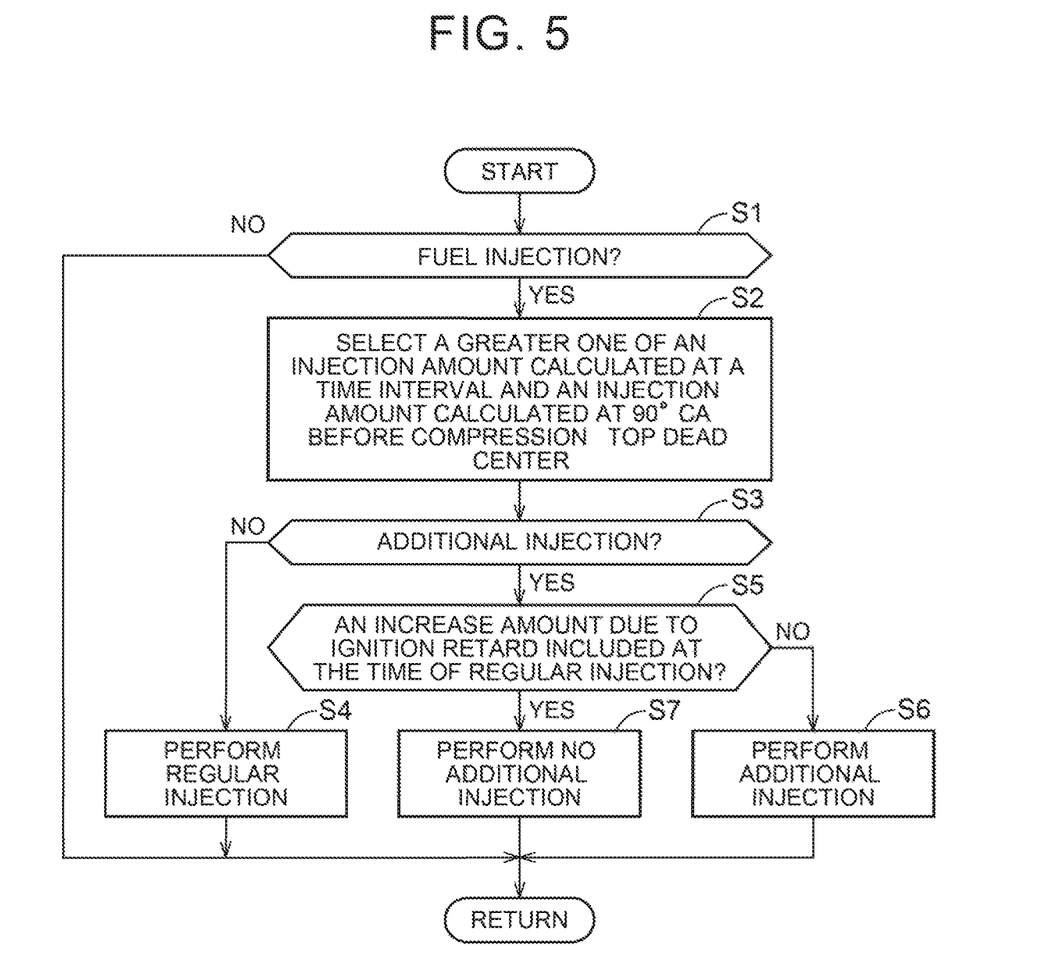
FIG. 5 is a flowchart for explaining one example of the sequence of setting a fuel injection amount by the ECU.

First, at step S1 in FIG. 5, it is determined whether or not it is the timing to perform fuel injection. For example, when the crank angle is 300° or 90° CA before the compression top dead center of each cylinder; it is determined to be the timing to perform fuel injection. If it is the timing to perform fuel injection, the flow proceeds to step S2, while if it is not the timing to perform fuel injection, the flow proceeds to RETURN.

Then, at step S2, a greater one of a fuel injection amount calculated at a predetermined time interval (e.g. 8 ms) and a fuel injection amount calculated at 90° CA before the compression top dead center is selected. If it is 90° CA before the compression top dead center at step S1, a greater one of a fuel injection amount calculated at the predetermined time interval and a fuel injection amount calculated at that time point (90° CA before the compression top dead center) is selected. On the other hand, if it is 300° CA before the compression top dead center at step S1, a greater one of a fuel injection amount calculated at the predetermined time interval and a fuel injection amount calculated at 90° CA before the compression top dead center of another cylinder is selected.

For example, when it is 90° CA before the compression top dead center of the fourth cylinder #4 (time t15 in FIG. 4), a greater one of a fuel injection amount calculated at the predetermined time interval (time t13) and a fuel injection amount calculated at that time point (time t15) is selected. On the other hand, when it is 300° CA before the compression top dead center of the fourth cylinder #4 (time t10), a greater one of a fuel injection amount calculated at the predetermined time interval (time t9) and a fuel injection amount calculated at 90° CA before the compression top dead center of the first cylinder #1 (timer) is selected.

Then, at step S3, it is determined whether or not it is additional injection. For example, when the crank angle is 90° CA before the compression top dead center, it is determined to be additional injection. If it is not additional injection, i.e. if it is regular injection, the flow proceeds to step S4, while if it is additional injection, the flow proceeds to step S5.

Then, at step S4, the injector 16 is controlled by the ECU 100 so that regular injection is carried out (e.g. time t6, time t10, and time t14 in FIG. 4), Specifically, the fuel in the fuel injection amount selected, at step S2 is injected, Thereafter, the flow proceeds to RETURN.

On the other hand, in the case of additional injection (step S3: Yes), it is determined at step S5 whether or not an increase amount due to ignition retard is included at the time of regular injection. For example, when the fuel injection amount selected at step S2 is greater than a fuel injection amount at the time of the regular injection, it is determined that the increase amount due to the ignition retard is not included at the time of the regular injection. If the increase amount due to the ignition retard is not included at the time of the regular injection, the flow proceeds to step S6, while if the increase amount due to the ignition retard is included at the time of the regular injection, the flow proceeds to step S7.

Then, at step S6, the injector 16 is controlled by the ECU 100 so that the increase amount due to the ignition retard is additionally injected (e.g., time t7 and time t11 in FIG. 4). The increase amount due to the ignition retard is a difference between the fuel injection amount selected at step S2 and the fuel injection amount at the time of the regular injection. Thereafter, the flow proceeds to RETURN.

At step S7, additional injection is not carried out (e.g. time t15 and time t17 in FIG. 4). Thereafter, the flow proceeds to RETURN.

As described above, in this embodiment, it is configured that an ignition timing is calculated at 90° CA before the compression top dead center, that a fuel injection amount is calculated at the predetermined time interval, and that a fuel injection amount is calculated at 90° CA before the compression top dead center. It is further configured that when the fuel injection amount calculated at 90° CA before the compression top dead center is increased due to retardation of the ignition timing while the operating condition of the internal combustion engine 1 is in the catalyst overheat warning range after the fuel in the injection amount calculated at the predetermined time interval is regularly injected, the fuel in an increase amount is additionally injected before ignition.

With this configuration, since the ignition timing and the fuel injection amount are calculated at 90° CA before the compression top dead center, when the ignition timing is retarded, the injection amount that is increased in accordance with the retard amount can be calculated. That is, after the ignition timing is finally determined, it is possible to calculate a fuel injection amount that takes into account the retard amount of the ignition tuning. Then, only an increase amount relative to the fuel injected at the time of regular injection is additionally injected before ignition so that retardation of the ignition timing can be performed early while suppressing overheating of the three-way catalyst 31. That is without waiting for an increase amount due to ignition retard to be reflected on an injection amount for regular injection calculated at the predetermined time interval, when retardation of the ignition timing is required, the increase amount due to the ignition retard can be additionally injected so that the ignition retard can be implemented early.

In this embodiment, when the operating condition of the internal combustion engine 1 is in the catalyst overheat warning range, the allowed number of times of fuel injection is increased so that even when the rotational speed of the internal combustion engine 1 is high (e.g., 3600 rpm or more), additional injection can be carried out.

In this embodiment, when the operating condition of the internal combustion engine 1 is in the catalyst overheat warning range, the timing of additional injection is retarded to 90° CA before the compression top dead center so that when an ignition timing calculated at 90° CA before the compression top dead center is retarded and an injection amount in accordance with a retard amount is calculated, an increase amount due to the retard can be additionally injected.

In this embodiment, when an injection amount calculated at the predetermined time interval includes an increase amount due to retardation of an ignition the fuel including the increase amount is regularly injected and additional injection is not carried out, thereby suppressing an increase in the number of times of injection.

In this embodiment, after increasing the allowed number of times of filet injection, the allowed number of times is returned to the initial value when the number of injection times of the same cylinder last time is greater than the allowed number of times at normal time. Accordingly, fuel injection exceeding the allowed number of times at normal time can be prevented from being carried out repeatedly in the same cylinder. This makes it possible to suppress overheating of control devices (EDUs) of the injectors 16.

The embodiment disclosed this time is by way of example in all aspects and is by no means a basis for limited interpretation. Therefore, the technical scope of the invention should not be interpreted solely by the above-described embodiment and is defined based on the description of the claims. Further, the technical scope of the invention includes all changes within the meaning and range of equivalency of the claims.

For example, in this embodiment, the example is shown in which the injector 16 that injects the fuel directly into the combustion chamber 14 is provided. However, the invention is not limited thereto. An injector that performs port injection may be provided in addition to an injector that injects fuel directly into a combustion chamber.

In this embodiment, the example is shown in which the internal combustion engine 1 is the inline four-cylinder gasoline engine. However, the invention is not limited thereto. An internal combustion engine may have an number of cylinders and may be a V-type engine or a horizontally opposed engine. Further, the fuel of an internal combustion engine may be other than gasoline.

In this embodiment, 90° CA before the compression top dead center is shown as one example of the predetermined crank angle. However, the invention is not limited thereto. The predetermined crank angle may be a value other than 90° CA before the compression top dead center.

In this embodiment, 8 ms is shown as one example of the predetermined time interval. However, the invention is not limited thereto. The predetermined time interval may be another value such as 16 ms.

In this embodiment, the example is shown in which regular injection is carried out at 300° CA before the compression to dead center. However, the invention is not limited thereto. Regular injection may be carried out at a timing other than 300° CA before the compression top dead center.

In this embodiment, the example is shown in which whether or not it is the catalyst overheat warning range is determined based on the rotational speed and the load factor of the internal combustion engine 1. However, the invention is not limited thereto. Whether or not it is the catalyst overheat warning range may be determined based on other parameters such as an exhaust gas temperature.

The invention is applicable to a control device for an internal combustion engine, that controls the internal combustion engine configured to retard the ignition timing for performing the torque down or the like.

What is claimed is:

1. A control device for an internal combustion engine, the internal combustion engine including: a fuel injection valve that injects fuel directly into a combustion chamber; an ignition device provided in the combustion chamber; and a catalyst provided in an exhaust passage, the control device comprising:
    an electronic control unit configured to:
        i) calculate an ignition timing at a predetermined crank angle;
        ii) calculate a first injection amount of the fuel at a predetermined time interval and calculate a second injection amount of the fuel at the predetermined crank angle; and
        iii) control the fuel injection valve to inject during one cycle the first injection amount of the fuel and to inject an additional injection before ignition when the second injection amount calculated at the predetermined crank angle is increased due to retardation of the ignition timing,
    wherein the electronic control unit is configured to:
        i) set an upper limit of the number of injections of the fuel in the one cycle; and
        ii) increase the upper limit of the number of injections when an operating condition of the internal combustion engine is in a catalyst overheat warning range where the injection amount is increased when the ignition timing is retarded.

2. The control device according to claim 1, wherein the catalyst overheat warning range is determined based on a load factor and a rotational speed.

* * * * *